United States Patent [19]

Siteman

[11] Patent Number: 4,795,117
[45] Date of Patent: Jan. 3, 1989

[54] BOTTLE STEADYING PLATFORM

[76] Inventor: Phyllis Siteman, 1262 S. Barrington Ave., Los Angeles, Calif. 90025

[21] Appl. No.: 138,719

[22] Filed: Dec. 28, 1987

[51] Int. Cl.⁴ ............................................. A47G 23/02
[52] U.S. Cl. .................................... 248/146; 248/133; 248/DIG. 10
[58] Field of Search ............... 248/146, 148, 149, 152, 248/309, 310, 311.2, 314, 133, DIG. 10; 211/74

[56] References Cited

U.S. PATENT DOCUMENTS

| 2,596,009 | 5/1952 | Connor et al. | 248/310 X |
| 2,633,248 | 3/1953 | Goldenberg | 211/74 |
| 2,659,920 | 11/1953 | Bogan et al. | 248/349 X |
| 2,748,952 | 6/1956 | Fleit et al. | 248/133 X |
| 3,029,058 | 4/1962 | Himler | 248/133 |
| 3,090,590 | 5/1963 | Hester | 211/74 X |
| 3,220,685 | 11/1965 | Himler | 248/133 |
| 3,964,709 | 6/1976 | LaBelle et al. | 248/311.2 X |
| 4,162,696 | 7/1979 | Sprung | 248/DIG. 10 X |

FOREIGN PATENT DOCUMENTS 0622680   5/1949   United Kingdom ....... 248/DIG. 10

Primary Examiner—Ramon O. Ramirez
Attorney, Agent, or Firm—William H. Maxwell

[57] ABSTRACT

A steadying platform for bottles, small bottles with liquid content and an applicator cap, and comprised of a base member with an upwardly open chamber closed by a platform member having an opening to pass the bottom end portion of the bottle with substantial clearance, and a body of formable material confined within the chamber to conform to and positionably secure the bottle, there being a cover over the platform and base members to obscure the chamber and said material.

19 Claims, 2 Drawing Sheets

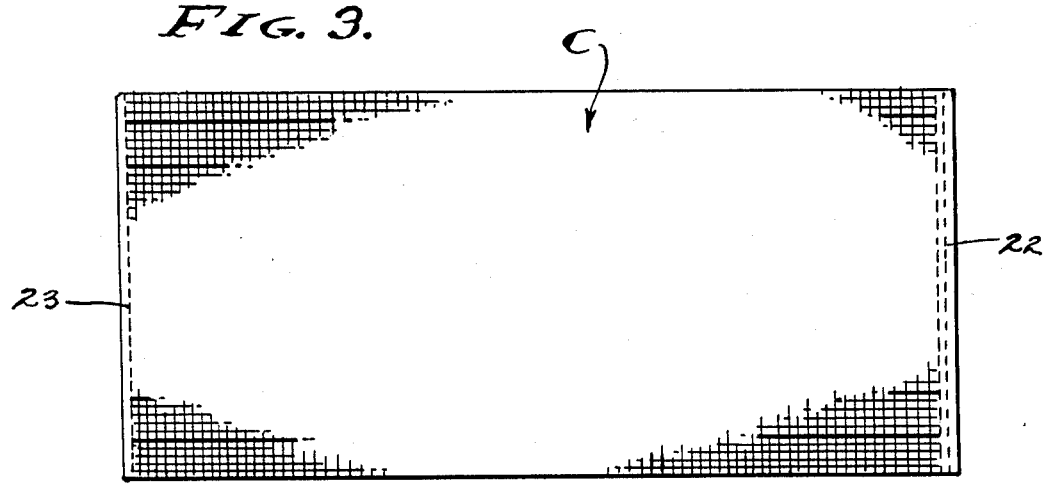
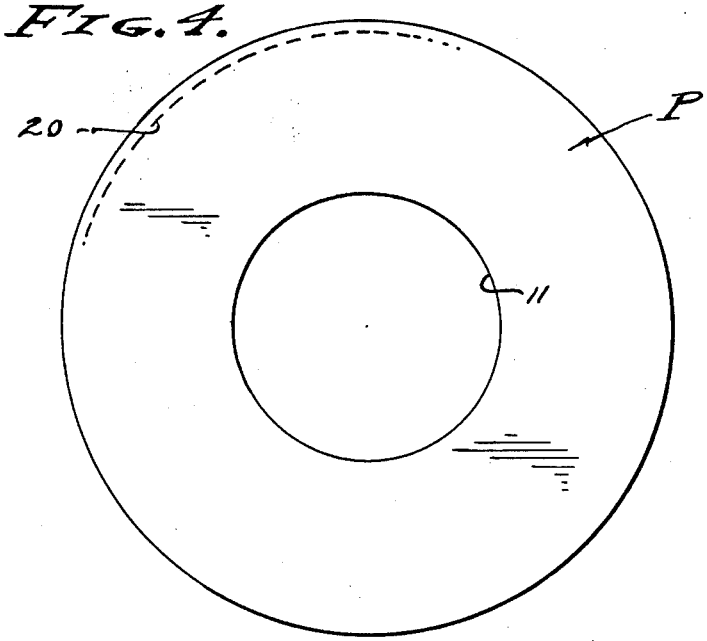
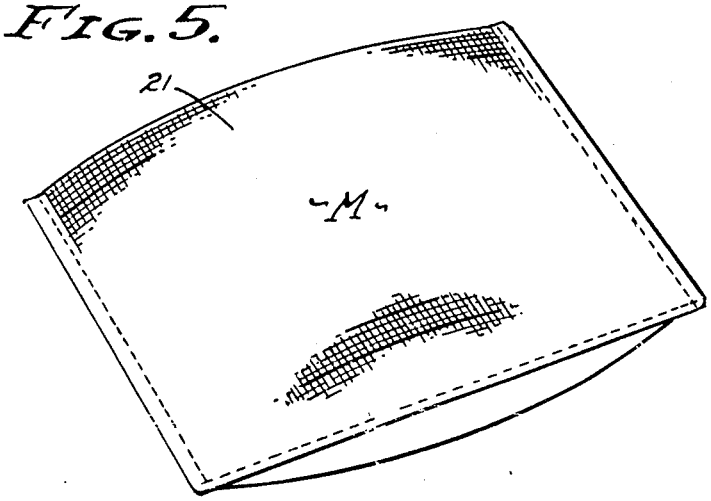

BOTTLE STEADYING PLATFORM

BACKGROUND OF THE INVENTION

This invention relates to a steadying device for containers from which liquids are dispensed. For example, there are products such as lacquers, paints, inks, adhesives and other applications such as medications etc., to name a few, which are dispensed from bottles closed by removable applicators in the forms of brushes, eyedroppers, or swabs and the like. In many instances the liquid product is sold in small containers of glass or plastic, and of varied configurations. Generally, such containers are stable when placed upon a large fat surface, but such a surface is not always available. However, the small size and lightness, especially the lightness of plastic bottles, renders them subject to accidental spills, especially with those which have seizable applicator caps. Therefore, stability is a problem, it being a general object of this invention to provide a practical and utilitarian steadying platform for bottles of the character described.

This invention is especially concerned with nail polish bottles and the like, from which a number of products are dispensed with an applicator cap. The liquid product involved is most often a lacquer whether it is a base coat, a top coat, or a clear coat etc., and such products can be very destructive when spilled, it being a primary object of this invention to prevent spilling of such liquids.

Bottles or containers for products of the type under consideration are furnished in a wide variety of sizes and shapes That is, they may be cylindrical, eliptical or polygonal, and they may be straight, or curved or tapered. Therefore, it is an object of this invention to accommodate any and all shapes and configurations of such bottles, with or without applicator caps. To this end, the steadying platform of the present inventon provides a weighted base that conforms to the configuration of and secures any such bottle in a usable position.

When manicuring one's finger nails, four basic objects are involved one is the bottle of nail polish, a second one is the applicator cap, and there are the two hands of the person manipulating the bottle and the applicator cap. Obviously, when the applicator cap is being manipulated the bottle is loose and free. And, there is the problem of steadiness of the hands when applying the applicator cap with one hand to the finger nails of the other hand. Therefore, it is an object of this invention to coordinate the above stated four basic objects, by providing the steadying platform which not only receives, secures and positions the dispensing bottle, but which also steadies the hand and fingers to which the nail polish is being applied, while simultaneously steadying the platform per se.

The foregoing objectives are accomplished by providing a weighted base and finger rest, in which the dispensing bottle can be situated as circumstances require, it being an object of this invention to provide a simple and practical device for the purpose above described, and a device which snugly conforms to the bottle shape, whatever it may be. It is to be understood that such bottles are removable from the device for shaking or mixing the liquid, or that such bottles which are not too sharply configured can simply be twirled when seated within the device.

SUMMARY OF THE INVENTION

This Bottle Steadying Platform is a device for receiving and securing a dispensing bottle in a secure manner while providing a rest to steady a person's hands while simultaneously steadying the device. A base is provided which contains material that conforms to and holds all bottle configurations within a range of size for which it is designed. The bottle is received and positioned as may be required and most often tipped for the comfortable manipulation of the applicator cap, it being understood that an erect position may be desired. A feature is that the device is weighted for stability of small light weight bottles which otherwise are very subject to being overturned when open and free to do so, while the person is using both hands for other purposes. It is small bottles with which this invention is particularly concerned.

The foregoing and various other objects and features of this invention will be apparent and fully understood from the following detailed description of he typical preferred form and application thereof, throughout which description reference is made to the accompanying drawings.

THE DRAWINGS

FIG. 3 is a plan view of the stretch sock employed a cover as shown in FIGS. 1 and 2

FIG. 4 is a plan view of the platform member taken as indicated by line 4—4 on FIG. 2.

Figure 2:
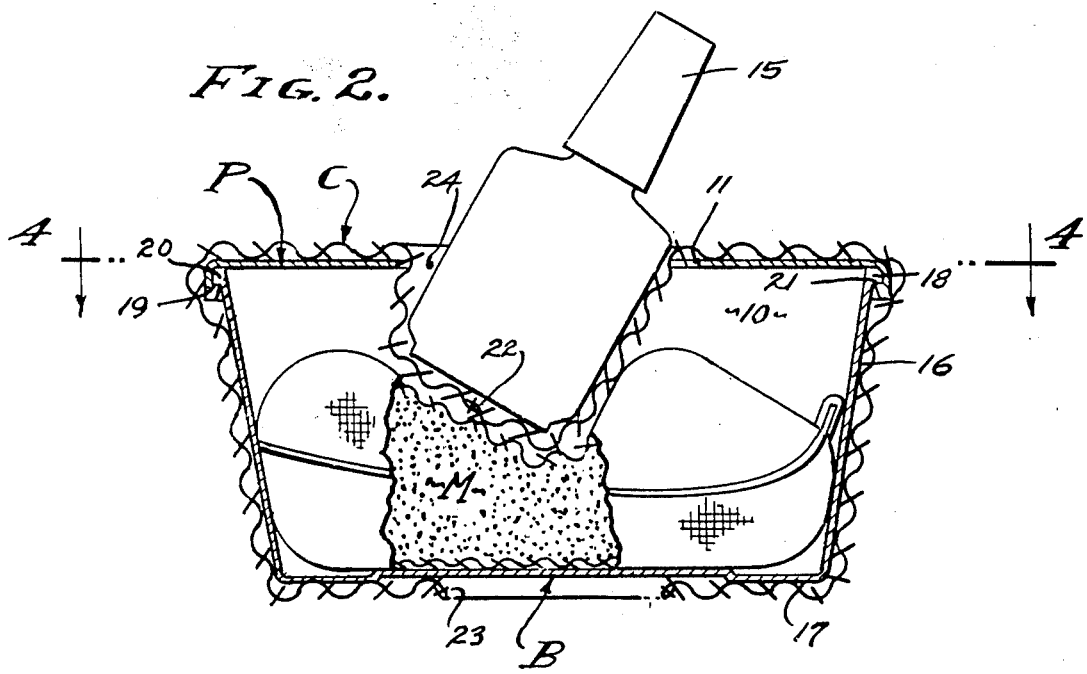
FIG. 2 is an enlarged transverse cross section of the device taken as indicated by line 2—2 on FIG. 1 with the hand and applicator cap.

And, FIG. 5 is a perspective view of the conformable bag of weight material, which is shown within the base member of FIG. 2.

PREFERRED EMBODIMENT

Figure 1:
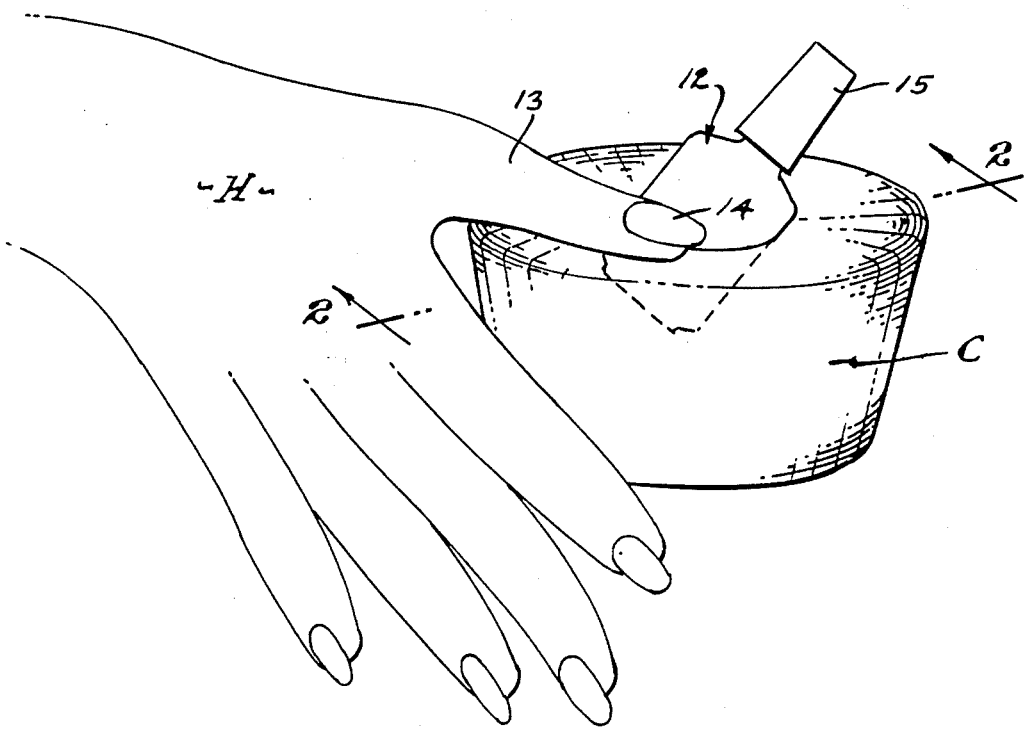
FIG. 1 is a perspective illustration of the Bottle Steadying Platform with a bottle received and positioned therein while steadying a person's hand which simultaneously stablizes the device.

Referring now to the drawings, the steadying platform is shown as comprised of a base member B with an upwardly open chamber 10 closed by a platform member P having an opening 11 through which the bottle 12 is received to be supported and positioned by a body of formable material M that establishes a ballast for stability. A cover C encloses the base and platform and has a center portion that is depressible into the chamber 10 through the opening 11. The hand H of a person is shown with one finger 13 supported and steadied by the platform P, thereby exposing the fingernail 14 for manicuring. In FIG. 2 the applicator cap 15 of FIG. 1 can be removed for manipulation by the other hand of the person (not shown). In FIGS. 1 and 2 the bottle 12 is shown tiled to a convenient angle, and it is to be understood that it ca also be inserted erect or in any other desired disposition, as may be required, within reason whereby the liquid contents remain therein when the applicator cap is removed.

The base member B is employed as a structure to support the platform P with the plane thereof above the body of formable . material M. The base member is preferably an upwardly open cup-shaped body of flattened cylinder form, or it may have shaped side walls 16 which are tapered as shown. In practice, the base member B is a cup having a flat bottom 17 and a rim 18 parallel with the bottom. As shown, the r presents a downwardly faced shoulder 19 to old the platform member P.

The platform member P i a planar structure that partially closes the chamber 10, and has the opening 11 which passe the center portion of the cover C and bottle 12 that is inserted therethrough. In practice, the platform member is round so as to coextensively overlie the base member, and the opening 11 is concentrically centered therein and preferably round with a diameter in excess of the cross sectional configuration of the bottle 12. Accordingly, the bottle 12 can be tilted within the opening 11 as desired. As shown, the platform member P snaps onto the base member B by providing it with an internal rim 20 that presents an upwardly faced shoulder 21 that engages beneath the shoulder 19 of the base member rim.

The body of formable material M is provided for support of and positioning of he bottle 12, and to serve as a weighted ballast for the device. That is, the material M is shapable and such that it retains the shape into which it is formed. As shown, the bottle 12 is depressed into the body of formable material so as to shape the same to the configuration of the lower portion of the bottle, as clearly shown in FIG. 2 of the drawings. In practice, loose sand or silica f 10 to 12 grit is employed for this purpose, and which readily conforms to the bottom portion configuration of the bottle 12 in whatever tilted position it might be placed by manipulation. As shown in FIG. 5, the sand or silica is contained in an envelope 21 of fabric or the like, for example of rectangular pillow form sewn together at the edges thereof as indicated. However, the form thereof can be round or rounded if so desired. A feature of the body of formable material M is that it forms a ballast, and to this end the weight of material M is preferably greater than the weight of the bottle 12 of liquid, and for example approximately six ounces when the bottle of liquid is two ounces.

The cover C is flexible and encloses the aforementioned base member B, platform member P and to obscure the body of formable material M. As shown in FIG. 3 of the drawings, the cover C is a tubular sock of stretchable material that is streched over the platform member P and the base member B as clearly shown in FIGS. 1 and 2. In practice, the cover C is of knit fabric that is circumferentially stretchable, of tubular form having a closed end 22 that is knitted together or sewn shut, and that has an open end 23 (see FIGS. 2 and 3). Accordingly, the cover is of sock configuration pulled over the members P and B so that the open end 23 closes partially over the bottom 17 of the base member B, and with the closed end in excess over the platform member P. A feature is the inversion of the closed end of the cover C into the opening 11, whereby the interior chamber 10 and body of formable material M are obscured, while establishing apocket 24 into which the bottle 12 can be inserted and positioned as shown and hereinabove described.

From the foregoing it will be understood how this steadying platform is constructed and used, to enable a person to conveniently and safely manicure fingernails, or to perform any similar process where bottles of liquid are dispensed or applied, and especially those which employ applicator caps. Convenience and safety are the principal attributes of the device herein disclosed.

Having described only the typical preferred forms and applications of my invention, I do not wish to be limited or restricted to the specific details herein set forth, but wish to reserve to myself any modifications or variations that may appear to those skilled in the art as set forth within the limits of the following claims.

I claim:

1. Steadying platform for a bottle and receiving and securing the bottle in a selected position, and including;
    a base member with an upwardly open chamber,
    a body of formable material carried within the chamber to conform with and support a bottom end portion of the bottle,
    a platform member closing the upwardly open chamber and confining the body of formable material within the chamber,
    the platform member having an opening therethough to receive and pass the bottom end portion of the bottle into the chamber, and said opening being larger than the bottom end portion of the bottle, whereby said bottle can be conveniently positioned and held by the body of formable material as limited by the size of said opening through the platform member.

2. The bottle steadying platform as set forth in Claim i, wherein the base member is a cup-shaped body with a flat bottom supporting the body of formable material and with a-rim parallel with said bottom, and wherein the platform member is carried by the rim of the cup-shaped body to overlie the same.

3. The bottle steadying platform as set forth in Claim i, wherein the base member is a cup-shaped body with a flat bottom supporting the body of formable material and with a rim parallel with said bottom and having a downwardly faced shoulder, and wherein the platform member is carried by the rim of the cup-shaped body and has a complementary rim with an upwardly faced shoulder for snapped engagement over the rim of the cupshaped body of the base member.

4. The bottle steadying platform as set forth in Claim i, wherein the platform member has a planar surface surrounding the opening therethrough for downward manual engagement and support of any one of the fingers of a person's hands.

5. The bottle steadying platform as set forth in Claim i, wherein the body of formable material is a loose material.

6. The bottle steadying platform as set forth in Claim i, wherein the body of formable material is a loose material confined within an envelope.

7. The bottle steadying platform as set forth in Claim i, wherein the body of formable material is sand confined within a fabric envelope set loose within the chamber of the base member.

8. A steadying platform for bottle and receiving and securing the bottle in a selected position, and including;
    a base member with an upwardly open chamber,
    a body of formable material carried with the chamber to conform with and support a bottom end portion of the bottle,
    a platform member closing the upwardly open chamber and confining the body of formable material within the chamber,
    the platform member having an opening therethrough to receive and pass the bottom end portion of the bottle into the chamber, and said opening being larger than the bottom end portion of the bottle, whereby said bottle can be conveniently positioned and held by the body of formable material as limited by the size of said opening through the platform member, and a flexible cover substantially enclosing the base member and overlying and entering through the opening through the platform member to obscure the chamber and receive the bottom end portion of the bottle.

9. The bottle steadying platform as set forth in Claim 8, wherein the base member is a cup-shaped body with a flat bottom supporting the body of formable material and with a rim parallel with sad bottom, and wherein the platform member is carried by the rim of the cup-shaped body to overlie the same.

10. The bottle steadying platform as set forth in Claim 8, wherein the base member is a cup-shaped body with a flat bottom supporting the body of formable material and with a rim parallel with said bottom and having a downwardly faced shoulder, and wherein the platform member is carried by the rim of the cup-shaped body and has a complementary rim with an upwardly faced shoulder for snapped engagement over the rim of the cup-shaped body of the base member.

11. The bottle steadying platform as set forth in Claim 8, wherein the platform member has a planar surface surrounding the opening therethrough for downward manual engagement and support of any one of the fingers of a person's hand.

12. The bottle steadying platform as set forth in Claim 8, wherein the body of formable material is a loose material.

13. The bottle steadying platform as set forth in Claim 8, wherein the body of formable material is a loose material confined within an envelope.

14. The bottle steadying platform as set forth in claim 8, wherein the body of formable material Is sand confined within a fabic envelope set loose within the chamber of the base member.

15. The bottle steadying platform as set forth in Calm 8, wherein the flexible cover is a tubular sock pulled over the platform member and base member with an open end thereof partially beneath the base member.

16. The bottle steadying platform as set forth in Claim 8, herein the flexible cover is a knitted sock pulled over the platform member and base member with an open end thereof partially beneath the base member.

17. The bottle steadying platform as set forth in claim 8, wherein the flexible cover is a circumferentially stretchable knit fabric sock of tube form pulled over the platform member and base member with an open end thereof partially underlying the base member.

18. The bottle steadying platform as set forth in claim 1, wherein the body of formable material is a weighted ballast confined within an envelope set loose within the chamber of the base member.

19. The bottle steadying platform as set forth in claim 9, wherein the body of formable material is a weighted ballast confined within an envelope set loose within the chamber of the base member.

* * * * *